United States Patent [19]

Karras et al.

[11] 4,440,507
[45] Apr. 3, 1984

[54] PROCEDURE FOR MEASURING THERMAL ENERGY TRANSPORTED BY FLUID FLOW

[75] Inventors: Matti R. Karras; Olavi Hirsimäki, both of Finnish, Finland

[73] Assignee: Valmet OY, Finland

[21] Appl. No.: 354,092

[22] PCT Filed: May 27, 1981

[86] PCT No.: PCT/FI81/00038
§ 371 Date: Jan. 26, 1982
§ 102(e) Date: Jan. 26, 1982

[87] PCT Pub. No.: WO81/03543
PCT Pub. Date: Dec. 10, 1981

[30] Foreign Application Priority Data

May 28, 1980 [FI] Finland .......................... 801730

[51] Int. Cl.³ .................................. G01K 17/08
[52] U.S. Cl. .................................. 374/39
[58] Field of Search .................... 374/39; 73/202

[56] References Cited

U.S. PATENT DOCUMENTS 3,167,957  2/1965  Ziviani ........................... 374/39
4,362,404  12/1982  Armstrong ..................... 374/39

FOREIGN PATENT DOCUMENTS 14934  2/1980  European Pat. Off. .
484928  10/1929  Fed. Rep. of Germany .
2330498  1/1975  Fed. Rep. of Germany .
2521008  11/1976  Fed. Rep. of Germany .
2528385  1/1977  Fed. Rep. of Germany .
2623972  12/1977  Fed. Rep. of Germany .
156036  7/1956  Sweden .
435791  10/1967  Switzerland .

Primary Examiner—Herbert Goldstein
Attorney, Agent, or Firm—Steinberg & Raskin

[57] ABSTRACT

A method is provided for measuring thermal power transferred to or from a flowing fluid, independent of the density and specific heat of the fluid. The method may also measure the thermal power transferred to or from the fluid independent of the flow rate of the fluid itself too. This is accomplished by providing a bypass in the fluid stream, determining thermal power transferred to or from the fluid flowing in this bypass line, and then relating the thermal power transferred in the bypass line to the thermal power of the principal fluid stream itself, by calculating temperatures at various points along the principal fluid stream and along the bypass line.

11 Claims, 2 Drawing Figures

PROCEDURE FOR MEASURING THERMAL ENERGY TRANSPORTED BY FLUID FLOW

BACKGROUND OF THE INVENTION

The present invention concerns a procedure for measuring thermal energy transported with the aid of fluid flow. The procedure of the invention is appropriate for measurement both of the increase and decrease of the heat contents in the heat-transporting fluid. The commonest area of application of the procedure is a commercial area heating distribution network; specifically for each house or for each area. The fluid transporting thermal energy may be any uniformly flowing fluid as regards its state of aggregation and its chemical composition, its most important characteristic being a high specific heat value.

Present-day heat quantity or thermal energy measurement techniques are based on separate measurement of a temperature differential $\Delta T = T_1 - T_2$ and separate measurement of a volumetric flow $\dot{V}$, the rate of change of thermal energy content then being:

$$\dot{Q} = \rho \cdot C \dot{V} (T_1 - T_2)$$

where $\rho$ = density of the fluid and $C$ = specific heat. The measurement of density of the fluid and specific heat is completely omitted nowadays, implying that no provision is made for their variations. If steps are taken to employ as thermal energy-transporting fluid, water which has been improved with additive substances, it is well conceivable that $\rho C$ may not always be as constant as is the case with pure water.

Of the various quantities to measured, $\dot{V}$ is substantially less accurate than $\Delta T$; if endeavours are made to improve the measuring accuracy of $\dot{V}$, this leads to very expensive meters, such as e.g. the inductive (magnetic) flow meter, which has a metering error amounting to ($\pm 0.5\%$ of the reading)+($\pm 0.5\%$ of full scale deflection).

The limitations imposed by area heating technology on the developing of the method of measurement—to mention a few of them—are:

the meter must not cause any significant increase in demand of pumping work; the upper limit for the pressure drop is quite generally 0.1 bar;

the power consumption of the meter should be minimized, and it must not exceed 0.1% of the thermal energy rate that is being measured;

the price at which the meter sells should be concordant with the savings regarding errors in the charging, owing to heightened accuracy of measurement.

SUMMARY OF THE INVENTION

The object of the invention is to achieve an improvement of previously known methods for measuring thermal energy transported by fluid flow. The more detailed object of the invention is to teach a procedure which is independent of the fluid's density and specific heat. Still one further object of the invention is to provide a procedure wherein the flow rate need not be measured at all. The rest of the objects of the invention, and the advantages gained with its aid, with become apparent in the disclosure of the invention.

The objects of the invention are attained by a procedure which is mainly characterized in that there is provided in parallel across the consumption unit (where the thermal energy is withdrawn from the fluid passing through the incoming line), a fluid by-pass flow through a by-pass line; that into said fluid by-pass flow is introduced or therefrom withdrawn thermal energy at a given rate; and that in said incoming line, in said return line and in said by-pass line respectively are measured the temperatures of the fluid flowing through said incoming line, the fluid flowing through said return line, and the fluid by-pass flow flowing through said by-pass line respectively, whereby the thermal energy transported with the aid of the fluid flow is measurable by the exclusive aid of the rate at which energy is introduced into the said fluid by-pass flow and of the said temperature measurements.

A number of significant advantages are gained by using the procedure of the invention.

The procedure of the invention contains in actual fact no measurement of flow rate at all, in the conventional sense, instead of which one permits a minor fluid short-circuit flow past the change-of-energy object under measurement (a heat exchanger for instance). In the procedure of the invention, one measures the rate at which the fluid's heat content changes in the object, merely by measurement of differential temperatures and by those relating to the auxiliary heating or cooling of the minor shunt flow. The procedure of the invention is independent of the percent magnitude of the shunt flow, of the density and specific heat of the fluid, and it is thus understood that these may vary without in any way deranging the measurement. The shunt flow is essential in the invention presented here, and the independence of density and specific heat which was mentioned is only achieved by heating or cooling the same fluid which serves as the actual vehicle proper. The procedure here described becomes increasingly favourable in the technical and economic respects with increasing pipeline size and energy quantity to be measured.

BRIEF DESCRIPTION OF THE DRAWINGS

The procedure of the invention shall be described in detail with reference being made to the principle solution presented in the figures of the attached drawings, but to which the invention is not meant to be exclusively confined.

In the drawings.

DETAILED DESCRIPTION OF PREFERRED EMBODIMENTS

Figure 1:
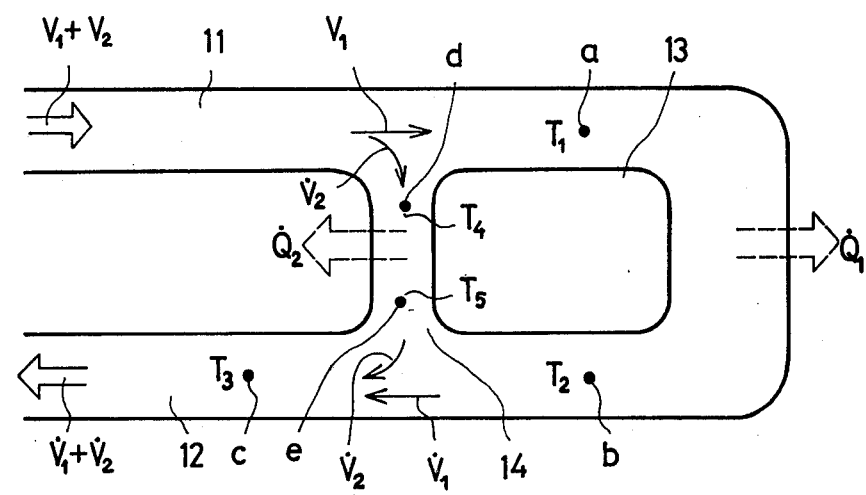
FIG. 1 is a schematic illustration of the method according to the present invention.

In the embodiment depicted in FIG. 1 of the drawings, the thermal energy flow $\dot{Q}_1$ is withdrawn from the flowing fluid $\dot{V}_1$, and this thermal flow rate is understood to be the quantity that is being measured. The basic insight of the present invention teaches that one provides in parallel with the unit 13 where energy is being consumed at a certain rate (e.g. a heat exchanger), a by-pass flow $\dot{V}_2$ for the fluid through a by-pass line 14. The fluid return line has been denoted with the reference numeral 12. In the incoming line 11, in the by-pass line 14 and in the return line 12 the fluid temperatures $T_1, T_2, T_3, T_4$ and $T_5$ are measured at the points a,b,c,d and e indicated in the figure. The thermal energy rate that one desires to determine is found with the aid of the said temperature measurements and of the rate $\dot{Q}_2$ at which thermal energy is carried into or withdrawn from the by-passing fluid $\dot{V}_2$. The procedure of the invention is based on the following equations:

$$\dot{Q}_1 = \rho \cdot C \cdot \dot{V}_1 \cdot (T_1 - T_2) \quad (1)$$

$$\dot{Q}_2 = \rho \cdot C \cdot \dot{V}_2 \cdot (T_4 - T_5) \quad (2)$$

$$\rho \cdot C \cdot (\dot{V}_1 + \dot{V}_2) \cdot T_3 = \rho \cdot C \cdot \dot{V}_2 \cdot T_5 + \rho \cdot C \cdot \dot{V}_1 \cdot T_2 \quad (3)$$

If these equations are solved for $\dot{Q}_1$ as a function of $\dot{Q}_2$ and of the temperatures $T_1, T_2, T_3, T_4$ and $T_5$, one finds:

$$\dot{Q}_1 = \frac{(T_1 - T_2) \cdot (T_5 - T_3)}{(T_4 - T_5) \cdot (T_3 - T_2)} \cdot \dot{Q}_2 \quad (4)$$

As can be seen from equation (4), the fluid density $\rho$ and specific heat C of the fluid cancel out, whereby the method is unresponsive to the potential fluctuations of these quantities. Owing to the symmetric nature of equation (4), the temperature dependence of $\rho C$ is nearly completely eliminated. Potential changes of the ratio of distribution, $k = \dot{V}_2/\dot{V}_1$, will cause no measuring error either, because this ratio is measured with the aid of differential temperatures (Equation 3). However the flow distribution ratio has practical significance in that it determines substantially the increase of the fluid pumping power required to achieve transport of thermal energy at the rate $\dot{Q}_1$. (It should be noted that the bypass flow is an extra flow made necessary by the procedure.) As readable from equation (4), the inaccuracy of measurement of the present procedure arises from the error in measurement of four differential temperatures and from the error in measuring the rate of thermal energy $\dot{Q}_2$. When the by-pass flow is made small, the differential temperature $T_3 - T_2$ will be small. Since $\dot{Q}_2$ represents that energy which the measuring process consumes, it should also be minimized, whereby then the differential temperature $T_4 - T_5$ will also be small. All considered, the differential temperatures $T_3 - T_2$ and $T_4 - T_5$ are small, whereby they are the main sources of error in the measuring procedure. The error incurred in the measuring of $\dot{Q}_2$ is essentially dependent on the method by which $\dot{Q}_2$ is introduced and transported to be incorporated in the by-pass flow. Since in actual fact $T_1$ and $T_4$ are identical, four temperature measuring pick-ups are required in the procedure.

When the flow distribution ratio $k(=\dot{V}_2/\dot{V}_1)$ is low and $\dot{Q}_2$ is so regulated that $T_4 - T_5 \approx T_3 - T_2$, then is it possible to say that the power (energy rate) needed for measurement is $Q_2 \approx k^2 \cdot Q_1$, and $T_3 - T_2 \approx T_4 - T_5 \approx k \cdot (T_1 - T_2)$, and the total volumetric flow rate (i.e., the pumping requirement) has increased by the factor $1 + k$.

In frequent instances, e.g. in area heating energy transmission, the differential temperature $T_1 - T_2$ is about 50° C. If it is possible to measure the differential temperatures $T_4 - T_5$ and $T_3 - T_2$ accurately enough even when they are about 1° C., the by-pass flow ratio might even be as low as 1/50. Hereby, thus, the pumping requirement would only increase by 2% and the temperature of the return water would be about 1° C. higher than in the case that $\dot{Q}_1$ were measured by conventional procedures. $\dot{Q}_2$ would only amount to 0.04% of $\dot{Q}_1$, whereby for instance if $\dot{Q}_1$ were 1 MW, then $\dot{Q}_2$ would only be 400 W. This energy, too, will be returned to the power plant and partly utilized. The temperature dependence of $\rho C$ introduces, with the parameters of this example, a correction coefficient amounting to a few tenths of one percent at the most and which is dependent on the temperature values used, with a gentle slope only.

The differential temperatures may be measured by any method in common use. However, attention should be paid to making the temperature pick-up mounting such that the said temperature represents, as well as possible, the average fluid temperature over the whole pipe cross section at the point of measurement in question. This is particularly important in the measurement of the temperature $T_3$, since if the mixing of the flows $\dot{V}_1$ and $\dot{V}_2$ is not quite thorough, even remarkable temperature gradients may be encountered.

The measuring of the power rate $\dot{Q}_2$ depends on the way in which energy is introduced in the by-pass flow or if in fact $\dot{Q}_2$ is negative, withdrawn from it.

For instance if $\dot{Q}_2$ is introduced into the by-pass flow by means of a heater resistance therein installed, it will suffice for the measurement of $\dot{Q}_2$ if the electric power uptake p of the heater resistance is measured, which can be done with adequate accuracy by well-established procedures. Then, thus:

$$\dot{Q}_1 = \frac{(T_1 - T_2)(T_5 - T_3)}{(T_4 - T_5)(T_3 - T_2)} \cdot p \quad (5)$$

Figure 2:
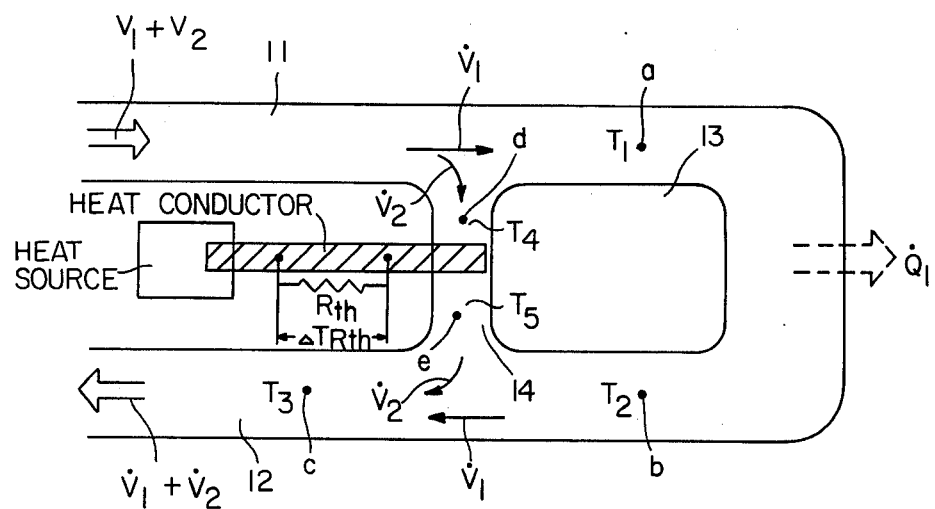
FIG. 2 is also a schematic illustration of the method according to the present invention in which a specific element is used in one of the steps of the method.

In principle, at least, energy may be carried into the by-pass flow or taken therefrom, by a heat conductor as well (see FIG. 2). It is possible in that case to measure the power rate $\dot{Q}_2$ in the form of the differential temperature $\Delta T_{R_{th}}$ building up across a given thermal resistance $R_{th}$. In that case, the entire measuring of thermal energy rate $\dot{Q}_1$ would reduce to measurement of temperatures exclusively, and then:

$$\dot{Q}_1 = \frac{\Delta T_{R_{th}}}{R_{th}} \cdot \frac{(T_1 - T_2) \cdot (T_5 - T_3)}{(T_4 - T_5) \cdot (T_3 - T_2)} \quad (6)$$

If the flow distribution ratio can be assumed to be known, measuring the temperature $T_3$ becomes superfluous. Then:

$$\dot{Q}_1 = \frac{1}{k} \cdot \frac{(T_1 - T_2)}{(T_4 - T_5)} \cdot \dot{Q}_2 \quad (7)$$

The effects which the zero point creep of the temperature pick-ups has on the critical differential temperatures $T_3 - T_2$ and $T_4 - T_5$ may be eliminated, as required. When $\dot{Q}_2 = 0$, $T_4 - T_5$ has to be zero. Similarly, for $\dot{V}_2 = 0$, $T_3 - T_2$ has to be zero. This implies a remarkable simplification of the requirements to be imposed on the differential temperature meters in question.

In the foregoing merely the principle solution of the invention has been presented, and it is obvious to a person skilled in the art that details of the invention may vary in numerous different ways within the scope of the inventive idea expressed in the attached claims.

We claim:

1. A method for measuring thermal power $\dot{Q}_1$ transferred to or from a fluid flowing through a consumption unit at a volumetric flow rate $\dot{V}_1$, comprising the steps of:

connecting a bypass line in parallel with a line carrying said fluid through said consumption unit and allowing a portion of said fluid to flow through said bypass line at a volumetric flow rate $\dot{V}_2$, transferring additional thermal power $\dot{Q}_2$ to or from said fluid flowing through said bypass, measuring temperature, $T_1$, of said fluid flowing in said consumption unit line as said fluid flows into said consumption unit before the transfer of $\dot{Q}_1$, measuring temperature, $T_2$, of said fluid flowing in said consumption unit line as said fluid flows out of said consumption unit after the transfer of $\dot{Q}_1$, measuring temperature, $T_4$, of fluid flowing through said bypass as said fluid flows into said bypass before the transfer of $\dot{Q}_2$, measuring temperature, $T_5$, of said fluid flowing through said bypass as said fluid flows out of said bypass after the transfer of $\dot{Q}_2$, measuring transfer of $\dot{Q}_2$ to or from said fluid flowing through said bypass, measuring temperature, $T_3$, of fluid flowing in a return line downstream of said consumption unit and bypass lines, and calculating the transfer of $\dot{Q}_1$ to or from said fluid flowing through said consumption unit, based on the following formula:

$$\dot{Q}_1 = \frac{(T_1 - T_2) \cdot (T_5 - T_3)}{(T_4 - T_5) \cdot (T_3 - T_2)} \cdot \dot{Q}_2.$$

2. The method of claim 1 in which the additional thermal power $\dot{Q}_2$ is introduced by a heater resistance disposed in the bypass line.

3. The method of claim 2 in which $\dot{Q}_2$ is calculated by measuring electrical power, p, supplied to said heater resistance.

4. The method of claim 1 in which the additional thermal power $\dot{Q}_2$ is introduced or withdrawn by a heat conductor disposed in the bypass line.

5. The method of claim 4 in which $\dot{Q}_2$ is calculated by measuring a temperature differential across a given length of said conductor between parallel surfaces normal to the heat flux.

6. The method of claim 1 which comprises the additional steps of maintaining a ratio, k, of volumetric flow rates $\dot{V}_2/\dot{V}_1$ relatively low, regulating the transfer of $Q_2$ so that $T_4 - T_5$ is roughly equal to $T_3 - T_2$, and determining $Q_1$ as roughly equal to $Q_2/k^2$.

7. A method for measuring thermal power $\dot{Q}_1$ transferred to or from a fluid flowing through a consumption unit at a volumetric flow rate $\dot{V}_1$, comprising the steps of:

connecting a bypass line in parallel with a line carrying said fluid through said consumption unit and allowing a portion of said fluid to flow through said bypass line at a volumetric flow rate $V_2$, transferring additional thermal power $\dot{Q}_2$ to or from said fluid flowing through said bypass, measuring temperature, $T_1$, of said fluid flowing in said consumption unit line as said fluid flows into said consumption unit before the transfer of $\dot{Q}_1$, measuring temperature, $T_2$, of said fluid flowing in said consumption unit line as said fluid flows out of said consumption unit after the transfer of $\dot{Q}_1$, measuring temperature, $T_4$, of fluid flowing through said bypass as said fluid flows into said bypass before the transfer of $\dot{Q}_2$, measuring temperature, $T_5$, of said fluid flowing through said bypass as said fluid flows out of said bypass after the transfer of $\dot{Q}_2$, measuring transfer of $\dot{Q}_2$ to or from said fluid flowing through said bypass, calculating the ratio of, k, of volumetric flow rates $V_2/V_1$ of fluid flowing through said bypass line to fluid flowing through said consumption unit line, and calculating the transfer of $\dot{Q}_1$ to or from said fluid flowing through said consumption unit, based on the following formula;

$$\dot{Q}_1 = \frac{1}{k} \cdot \frac{(T_1 - T_2)}{(T_4 - T_5)} \cdot \dot{Q}_2.$$

8. The method of claim 7 in which the additional thermal power $Q_2$ is introduced by a heater resistance disposed in the bypass line.

9. The method of claim 8 in which $Q_2$ is calculated by measuring electrical power, p, supplied to said heater resistance.

10. The method of claim 7 in which the additional thermal power $Q_2$ is introduced or withdrawn by a heat conductor disposed in the bypass line.

11. The method of claim 10 in which $Q_2$ is calculated by measuring a temperature differential across a given length of said conductor between parallel surfaces normal to the heat flux.

* * * * *